(12) United States Patent
Schroeder et al.

(10) Patent No.: US 9,407,187 B2
(45) Date of Patent: Aug. 2, 2016

(54) SYSTEM AND METHOD FOR IMPROVING RESPONSE TIME OF A BRAKING UNIT

(71) Applicant: General Electric Company, Schenectady, NY (US)

(72) Inventors: Stefan Schroeder, Munich (DE); Ara Panosyan, Munich (DE); Christoph Boeld, Munich (DE); Herbert Schaumberger, Muenster (AT); Xiaoting Dong, Munich (DE); Uwe Liebscher, Kufstein (AT)

(73) Assignee: General Electric Company, Niskayuna, NY (US)

( * ) Notice: Subject to any disclaimer, the term of this patent is extended or adjusted under 35 U.S.C. 154(b) by 73 days.

(21) Appl. No.: 14/339,552

(22) Filed: Jul. 24, 2014

(65) Prior Publication Data

US 2014/0333268 A1 Nov. 13, 2014

Related U.S. Application Data (63) Continuation-in-part of application No. 13/536,245, filed on Jun. 28, 2012.

(51) Int. Cl.
*B60L 7/00* (2006.01)
*H02P 15/00* (2006.01)
(Continued)

(52) U.S. Cl.
CPC .............. *H02P 15/00* (2013.01); *F03D 7/0244* (2013.01); *F03D 7/0272* (2013.01);
(Continued)

(58) Field of Classification Search
CPC ............. H02P 3/04; H02P 15/00; H02P 9/06; H02P 3/12; H02K 7/104; H02K 49/046; F03D 7/0244; F03D 7/0272; F16D 2121/20; Y02E 10/723

USPC .......... 188/161, 162, 164; 322/21, 23, 25, 28; 310/93, 94; 318/492, 759; 290/7, 40 B, 290/52

See application file for complete search history.

(56) References Cited

U.S. PATENT DOCUMENTS 5,485,901 A 1/1996 Akima et al.
5,685,398 A 11/1997 Marshall et al.
(Continued)

FOREIGN PATENT DOCUMENTS

CN 102709944 A 10/2012
CN 202685972 U 1/2013
(Continued)

OTHER PUBLICATIONS

"Eddy Current & AC DYNO mite Absorbers", Land sea, Mar. 14, 2009, 2 Pages.
(Continued)

*Primary Examiner* — Pamela Rodriguez
(74) *Attorney, Agent, or Firm* — Ann M. Agosti (57) ABSTRACT

A braking system includes a converter, a capacitor coupled to an output of the converter, a bridge coupled in parallel to the capacitor, and at least one inductor coupled to the bridge, an electrically conductive disc disposed proximate to the at least one inductor, and a switching unit controller for commanding the converter to convert a level of voltage supplied therefrom from a first voltage level to a second voltage level and thereby increase energy stored in the capacitor, and, upon receiving a brake command, commanding the bridge to ramp-up electrical current in the at least one inductor so as to induce an electromagnetic force on the electrically conductive disc.

19 Claims, 4 Drawing Sheets

(51) Int. Cl.
*H02P 3/04* (2006.01)
*H02K 49/04* (2006.01)
*F03D 7/02* (2006.01)
*H02P 9/06* (2006.01)
*H02P 3/12* (2006.01)
*H02K 7/104* (2006.01)
*F16D 121/20* (2012.01)

(52) U.S. Cl.
CPC ............... *H02K 49/046* (2013.01); *H02P 3/04* (2013.01); *H02P 3/12* (2013.01); *H02P 9/06* (2013.01); *F16D 2121/20* (2013.01); *H02K 7/104* (2013.01); *Y02E 10/723* (2013.01)

(56) References Cited

U.S. PATENT DOCUMENTS

| | | | |
|---|---|---|---|
| 5,821,712 A | 10/1998 | Fittje | |
| 6,149,544 A | 11/2000 | Masberg et al. | |
| 6,253,885 B1 | 7/2001 | Tsai et al. | |
| 6,425,838 B1 | 7/2002 | Matsubara et al. | |
| 6,460,828 B1 | 10/2002 | Gersemsky et al. | |
| 6,619,760 B1 | 9/2003 | Anwar | |
| 6,702,404 B2 | 3/2004 | Anwar et al. | |
| 6,731,034 B1 | 5/2004 | Habele et al. | |
| 7,173,399 B2 | 2/2007 | Sihler et al. | |
| 7,395,888 B2 * | 7/2008 | Yamamoto | B60K 6/42 180/233 |
| 7,944,067 B2 | 5/2011 | Kammer et al. | |
| 7,976,434 B2 | 7/2011 | Radow et al. | |
| 8,021,112 B2 | 9/2011 | Dinjus et al. | |
| 8,265,843 B2 | 9/2012 | Hornbrook et al. | |
| 8,299,735 B2 * | 10/2012 | Horng | H02P 3/14 318/362 |
| 8,428,840 B2 | 4/2013 | O'Dea et al. | |
| 8,471,534 B2 | 6/2013 | Panosyan et al. | |
| 8,540,324 B2 | 9/2013 | Leiber et al. | |
| 8,786,997 B2 | 7/2014 | Maruno et al. | |
| 8,994,201 B2 | 3/2015 | Farley | |
| 2002/0170791 A1 | 11/2002 | Saito et al. | |
| 2004/0070269 A1 | 4/2004 | Anwar et al. | |
| 2005/0205712 A1 | 9/2005 | Aisenbrey | |
| 2007/0210584 A1 * | 9/2007 | Stahlhut | H02P 9/48 290/52 |
| 2010/0134062 A1 * | 6/2010 | Knoedgen | H02M 3/158 318/492 |
| 2010/0241283 A1 | 9/2010 | Desai et al. | |
| 2012/0049805 A1 * | 3/2012 | Panosyan | H02P 9/107 322/21 |
| 2012/0104754 A1 | 5/2012 | Rudolf et al. | |
| 2012/0201657 A1 | 8/2012 | Donnelly et al. | |
| 2012/0330522 A1 | 12/2012 | Gibson et al. | |
| 2013/0015026 A1 | 1/2013 | Li et al. | |
| 2013/0306389 A1 | 11/2013 | Penev | |
| 2014/0001756 A1 | 1/2014 | Panosyan et al. | |
| 2014/0015506 A1 * | 1/2014 | Hsiao | G05F 5/00 323/299 |
| 2015/0061298 A1 * | 3/2015 | Panosyan | H02P 9/04 290/40 B |
| 2015/0194913 A1 * | 7/2015 | Hessler | B04B 9/10 318/759 |
| 2015/0217660 A1 | 8/2015 | Manabe et al. | |

FOREIGN PATENT DOCUMENTS

| | | |
|---|---|---|
| CN | 103089857 A | 5/2013 |
| GB | 444854 A | 3/1936 |
| JP | 60167602 A | 8/1985 |
| JP | 2011190918 A | 9/2011 |
| WO | 8808636 A1 | 11/1988 |
| WO | 2009011615 A1 | 1/2009 |

OTHER PUBLICATIONS

Karakoc, "Modeling and Design Optimization of Electromechanical Brake Actuator Using Eddy Current0073", 2012, 153Pages.
U.S. Appl. No. 13/536,245, filed Jun. 28, 2012, Panosyan et al.
U.S. Appl. No. 14/540,536, filed Nov. 13, 2014, Panosyan et al.
U.S. Appl. No. 14/566,145, filed Dec. 10, 2014, Panosyan et al.
A European Search Report and Opinion issued in connection with corresponding EP Application No. 15177889.1 on Jan. 21, 2016.
Qian et al., "Modeling And Control Of Electromagnetic Brakes For Enhanced Braking Capabilities For Automated Highway Systems", Intelligent Transportation System, ITSC, IEEE Conference, Conference Location Boston, MA, pp. 391-396, Nov. 9-12, 1997.
Bryanston-Cross et al., "Whole-Field Visualisation And Velocity Measurement Of An Instantaneous Transonic Turbine Flow", Instrumentation in Aerospace Simulation Facilities, ICIASF '97 Record., International Congress on, IEEE, Conference Location Pacific Grove, CA, pp. 278-286, 1997.
Gosline et al., "On The Use of Eddy Current Brakes as Tunable, Fast Turn-On Viscous Dampers For Haptic Rendering", Proc. Eurohaptics, pp. 229-234, 2006.
Adly et al., "Speed-Range-Based Optimization Of Nonlinear Electromagnetic Braking Systems", IEEE Transactions on Magnetics, vol. No. 43, Issue No. 6, pp. 2606-2608, Jun. 2007.
Alsaihati, "Simulation And Economic Analysis of a Hybrid Wind Diesel System For Remote Area Power Supply", IMEPE, Aug. 23, 2010.
Antipova, "The Use of an Electromagnetic Brake to Improve the Dynamic Stability of a Power System", Power Systems and Electric Networks, Power Technology and Engineering, vol. No. 46, Issue No. 1, pp. 75-80, May 2012.
Non-Final Rejection towards related U.S. Appl. No. 13/536,245 dated Aug. 19, 2014.
Non-Final Rejection towards related U.S. Appl. No. 13/536,245 dated May 12, 2015.

* cited by examiner

SYSTEM AND METHOD FOR IMPROVING RESPONSE TIME OF A BRAKING UNIT

CROSS REFERENCE TO RELATED APPLICATIONS

This application is a continuation in part of U.S. patent application Ser. No. 13/536,245, entitled "ELECTROMAGNETIC BRAKING SYSTEMS AND METHODS," filed 28 Jun. 2012, which is herein incorporated by reference.

BACKGROUND

The disclosure relates generally to a power generation system and more specifically to improved response time of a braking unit in a power generation system.

Typically, when a fault in a utility system occurs, voltage in the utility system may suddenly decrease by a certain amount. This sudden decrease of the voltage may result in a sudden reduction of an electrical power output of a generator. As a consequence, there may be unbalance between the electrical power output of the generator and mechanical power input from an engine. This in turn causes acceleration of the generator, which may lead to loss of synchronism between the generator and an electrical grid. Also, stability of the electric grid may be jeopardized if the generator is disconnected. It is therefore desirable for the generators to remain synchronized to the grid, to ride through low voltage conditions, and to be able to feed electric power into the grid immediately after the fault is cleared.

Various techniques may be employed to overcome the issue of rapid acceleration in the generator during fault conditions. One such technique is to employ a braking unit in a power generation system to control speed of a rotor in the generator. In one example, the braking unit includes one or more coils that are disposed proximate to the rotor, and, when a voltage is applied to these coils, electromagnetic braking force is induced on the rotor such that the speed of the rotor is controlled accordingly. Due to the inductive nature of the coils, the rate of change in the electrical current in the coils is limited by the applied voltage and may require a longer than desired braking response time. To improve the response time, a higher voltage power source may be coupled to the coils. However, such power source would increase the cost and size of the braking unit and may be impractical.

Hence, there is a need for an improved system and method for providing effective and inexpensive electromagnetic brakes on the rotor. Also, there is a need to provide a braking unit having a fast response time.

BRIEF DESCRIPTION

In accordance with one embodiment described herein, a braking system includes a converter, a capacitor coupled to an output of the converter, a bridge coupled in parallel to the capacitor, at least one inductor coupled to the bridge, an electrically conductive disc disposed proximate to the at least one inductor, and a switching unit controller for commanding the converter to convert a level of voltage supplied therefrom from a first voltage level to a second voltage level and thereby increase energy stored in the capacitor, and, upon receiving a brake command, commanding the bridge to ramp-up electrical current in the at least one inductor so as to induce an electromagnetic force on the electrically conductive disc.

In accordance with a further aspect of the present disclosure, a method includes commanding a converter to increase a level of voltage supplied therefrom from a first voltage level to a second voltage level and thereby increase energy stored in a capacitor coupled in parallel between the converter and a bridge. The method further includes, upon receiving a brake command, causing the bridge to ramp-up electrical current in at least one inductor so as to induce an electromagnetic force on an electrically conductive disc.

In accordance with another aspect of the present disclosure, a power generation system includes an electrically conductive disc coupled to a rotatable shaft, at least one inductor disposed proximate to the electrically conductive disc, a power source, and a switching unit coupled between the power source and the at least one inductor. The switching unit comprises a converter, a capacitor coupled to an output of the converter, a bridge coupled in parallel to the capacitor, and a switching unit controller for commanding the converter to convert a level of voltage supplied therefrom from a first voltage level to a second voltage level and thereby increase energy stored in the capacitor, and, upon receiving a brake command, commanding the bridge to ramp-up electrical current in the at least one inductor so as to induce an electromagnetic force on the electrically conductive disc.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for improving a response time of a braking unit in a power generation system are presented. By employing the methods and the various embodiments of the system described hereinafter, speed of a rotatable shaft may be controlled within a desired time period, which in turn improves LVRT (low voltage ride through) or FRT (fault ride through) capabilities in the power generation system.

Figure 1:
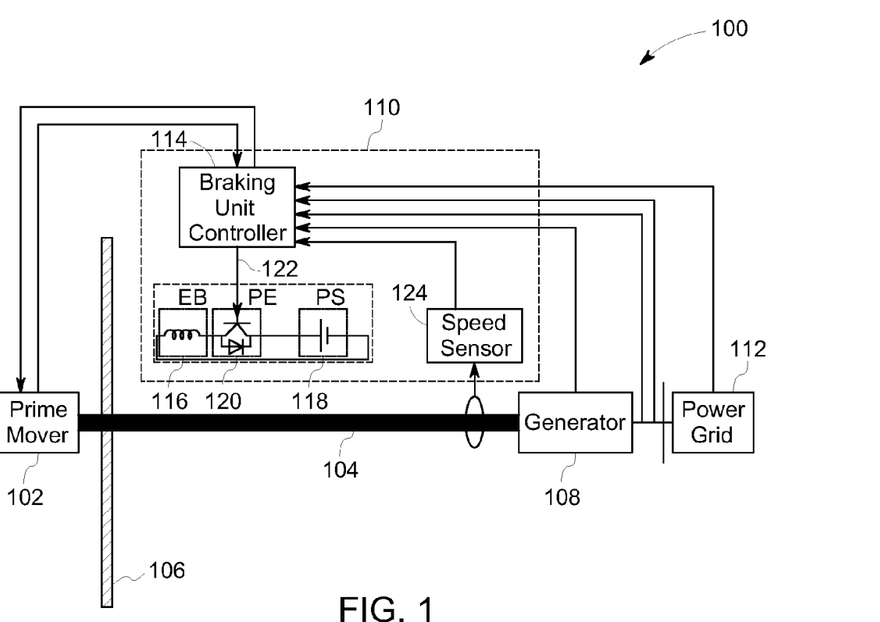
FIG. 1 is a diagrammatical representation of a power generation system utilizing a braking unit, in accordance with aspects of the present disclosure.

Referring to FIG. 1, a power generation system 100 having a braking unit, in accordance with aspects of the present disclosure, is depicted. The power generation system is typically used to convert mechanical power into electrical power. For example, in a wind system the kinetic energy of wind passing across a wind turbine is converted into mechanical power. As another example, mechanical power may be generated from a gas engine. This mechanical power is in turn used to generate electrical power. The power generation system includes a prime mover 102, a rotatable shaft 104, an electrically conductive disc 106, a generator 108, and a braking unit 110.

In one configuration, the prime mover 102 is mechanically coupled to the power generator 108 through the rotatable shaft 104. The rotatable shaft 104 is typically used to convey mechanical power from the prime mover 102 to the power generator 108. For example, the mechanical power produced at the prime mover 102 may be used to rotate the rotatable shaft 104 at a predetermined speed. This rotation of the rotatable shaft 104 in turn rotates a rotor (not shown) of the generator 108 to generate electrical power. Further, the generated electrical power at the generator 108 may be transferred to a power grid 112.

In the embodiment of FIG. 1, the electrically conductive disc 106 is rigidly coupled to the rotatable shaft 104 to control the rotational speed of the rotatable shaft 104. Particularly, when a fault (such as a voltage fall or drop) occurs in the system, the braking unit 110 may receive one or more command signals from the power generation system 100. In one example, the one or more command signals may include or result from one or more status signals received from the power generation system 100. The status signals may be representative of a rotational speed of the rotatable shaft 104, a voltage in the power grid 112, a current at the power generator 108, a mechanical power produced by a prime mover 102, a rotor angle of the power generator 108, an electrical power produced by the power generator 108 or combinations thereof. In one embodiment, the rotational speed of the rotatable shaft 104 may be determined by a speed sensor 124 that is operatively coupled to the rotatable shaft 104.

In response to receiving the command signals, the braking unit 110 induces an electromagnetic force on the electrically conductive disc 106, which in turn regulates or controls the rotational speed of the rotatable shaft 104. In one example, the speed of the rotatable shaft 104 may be regulated or controlled below a threshold speed value. Moreover, by regulating the rotational speed of the rotatable shaft 104, the braking unit 110 may maintain synchronism between the generator 108 and the power grid 112.

As further shown in FIG. 1, the braking unit 110 includes a braking unit controller 114, an inducting unit 116, a power source 118, and a switching unit 120. The inducting unit 116 is coupled to the power source 118 via the switching unit 120 and comprises one or more inductors that are disposed proximate to the electrically conductive disc 106. Further, the braking unit controller 114 is coupled to the switching unit 120 and may send a brake command 122 based on one or more command signals received from the power generation system 100. The brake command 122 may be sent to the switching unit 120 to control the voltage applied to the inducting unit 116.

Figure 2:
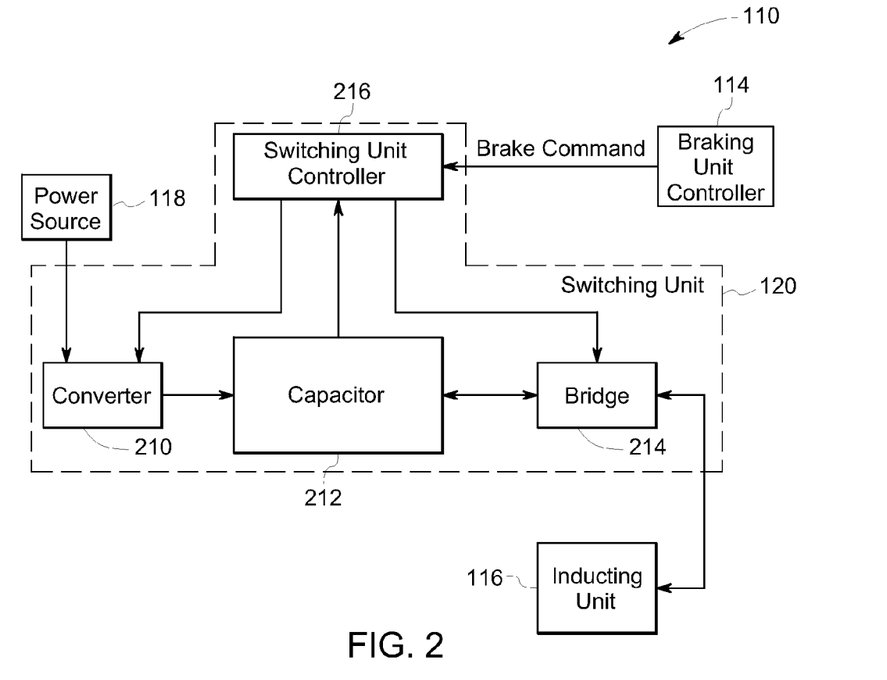
FIG. 2 is a block diagram of the braking unit, in accordance with aspects of the present disclosure.

Referring to FIG. 2, a more detailed block diagram of the braking unit 110, in accordance with aspects of the present disclosure, is depicted showing the switching unit 120 as comprising a converter 210, a capacitor 212, a bridge 214 and a switching unit controller 216.

The power source 118 may comprise a low power source, for example, such as a battery having a voltage at a first voltage level. In one example, the first voltage level may be in a range from about 5V to about 50V.

The inducting unit 116 is disposed proximate to an electrically conductive disc 106 (FIG. 1) that is rigidly coupled to a rotatable shaft 104 (FIG. 1) of a power generator 108 (FIG. 1). Particularly, the inducting unit 116 comprises one or more inductors that are disposed proximate to the electrically conductive disc 106 to induce an electromagnetic force on the electrically conductive disc 106. In one example, the one or more inductors may represent electrical coils that are disposed near either side or both sides of the electrically conductive disc 106.

The switching unit 120 is operatively coupled between the power source 118 and the inducting unit 116 and is used to control the voltage applied to the inducting unit 116 based on a brake command 122 received from the braking unit controller 114. In the embodiment of FIG. 2, the switching unit 120 comprises the converter 210, the capacitor 212, the bridge 214 and the switching unit controller 216. Although the switching unit controller 116 is shown as being included within the switching unit 120 for purposes of example, the switching unit controller 216 may alternatively be integrated within the braking unit controller 114 in some embodiments. The converter 210 is coupled between the power source 118 and the capacitor 212. The converter 210 is used to convert the voltage provided by the power source 118 and thereby increase the energy stored in the capacitor 212. Further, the bridge 214 is coupled between the capacitor 212 and the inducting unit 116. The bridge 214 is used to provide the energy stored in the capacitor 212 to the one of more inductors when the brake command is received by the switching unit controller 216. The bridge 214 may further be used to provide energy from the inducting unit 116 to the capacitor 212 when the brake command ceases. As used herein "brake command ceases" is intended to cover either (a) the stopping of transmission of the brake command (in the circumstance wherein the switching unit controller continuously receives the command during braking until braking is completed) or (b) a separate command to stop braking (in the circumstance wherein the switching unit controller receives a discrete braking command at one time instance and a separate command to stop braking at a later time instance). Until the brake command ceases, the brake command is referenced as "remaining active."

During operation, the power source 118 is active, and the converter 210 converts the voltage provided by the power source 118 from the first voltage level to the second voltage level which in one example is in the range from about 200V to about 600V for charging the capacitor 212. In a more specific example, the voltage in the capacitor 212 is increased to about 400V.

At a later point in time, if the switching unit controller 216 receives the brake command from the braking unit controller 114, the switching unit controller 216 then commands the bridge 214 to provide the voltage in the capacitor 212 to the inducting unit 116 so as to induce the electromagnetic force on the electrically conductive disc 106 (FIG. 1). Particularly, the second voltage in the capacitor 212 is used to provide a fast ramp-up of electrical current in the inducting unit 116. In one example, the electrical current may be ramped up in the inducting unit 116 within a first time period ranging from about 5 ms to about 50 ms. This fast ramp-up of electrical current in the inducting unit 116 may reduce time to induce the electromagnetic force on the electrically conductive disc 106, and thus improve the response time of the braking unit 110 to induce the electromagnetic force on the electrically conductive disc 106.

When braking, as the electrical current ramps up in the inducting unit 116, the energy stored in the capacitor 212 is reduced. In one embodiment, if the switching unit controller 216 determines that the energy stored in the capacitor 212 has fallen below a threshold value, the switching unit controller 216 commands the converter 210 to again increase the level of voltage supplied by the power source 118 above the first voltage level. In a more specific embodiment, the increase is not to the level of the second voltage level but is to a third voltage level that is less than the second voltage level. In one example, the third voltage level may be in a range from about 50V to about 100V. In this embodiment, the converter 210 may continuously charge the capacitor 212 at the third voltage level while further braking is needed. Thus, the capacitor 212 may be continuously charged at the third voltage level so that the electrical current may flow continuously in the inducting unit 116 to compensate the electrical losses in the one or more inductors of the inducting unit 116 and maintain the current in one or more inductors at a steady state.

Furthermore, at some point after the speed of the rotatable shaft 106 is controlled, the brake command will cease. The switching unit controller 216 may then command the bridge 214 to stop providing energy from the capacitor 212 to the inducting unit 116. Further, in an optional embodiment, the switching unit controller 216 may command the inducting unit 116 to provide any remaining energy to the capacitor 212 and thereby recharge the capacitor 212 to a fourth voltage level. Due to electrical losses in the one or more inductors of the inducting unit 116, the fourth voltage level may be less than the second voltage level. In this embodiment, to compensate these electrical losses, the switching unit controller 216 may then command the converter 210 to convert the voltage supplied by the power source 118 from the first voltage level back up to the second voltage level such that the capacitor 212 is further charged to increase the voltage in the capacitor 212 from the fourth voltage level to the second voltage level. This cycle may be repeated again if the switching unit controller 216 once again receives the brake command from the braking unit controller 114.

Thus, by employing a sufficiently large capacitor 212 in the switching unit 120, energy associated with a high enough voltage for fast braking may be stored and may be provided to the inductors to build-up fast ramp-up of electrical current in the one or more inductors of inducting unit 116. This in turn improves the response time of the braking unit 110 to induce the electromagnetic force on the electrically conductive disc 106.

Figure 3:
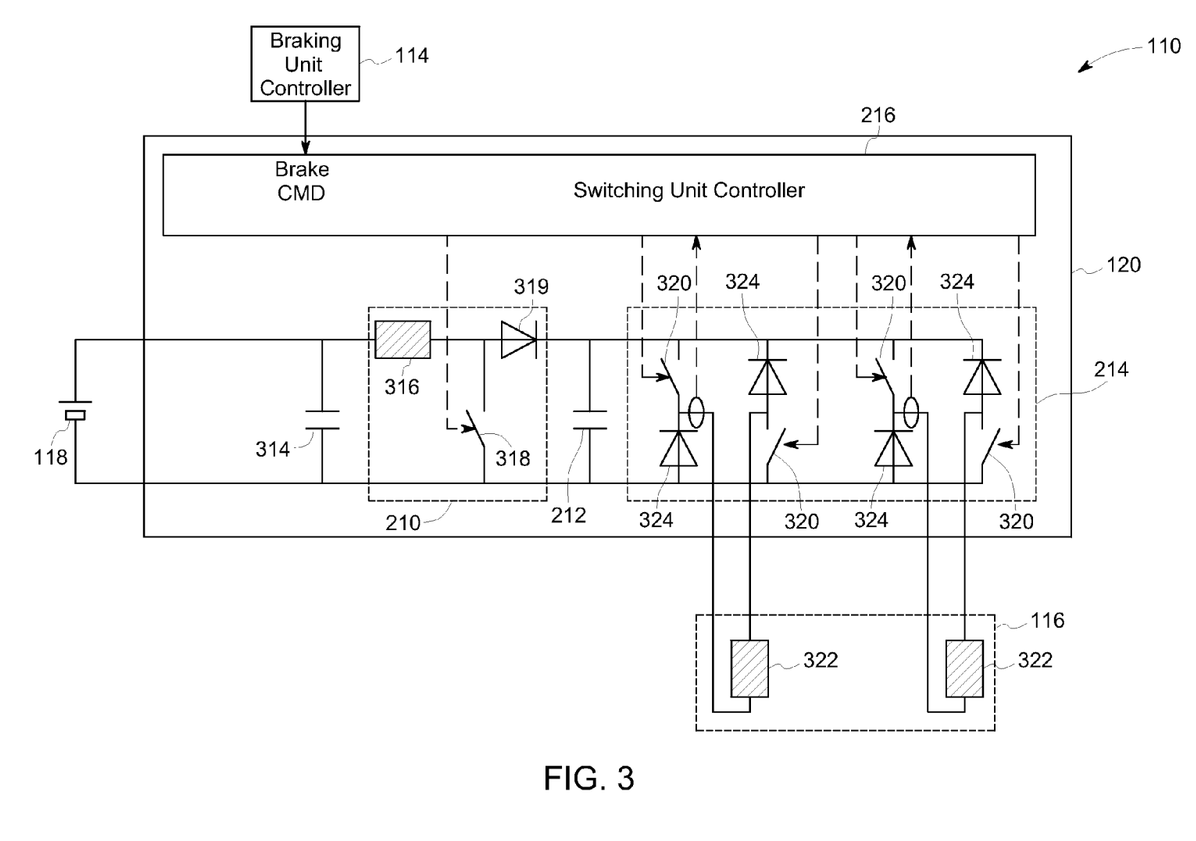
FIG. 3 is a circuit diagram of the braking unit, in accordance with aspects of the present disclosure.

Referring to FIG. 3 a circuit diagram (schematic view) of a braking unit 110, in accordance with aspects of the present disclosure, is depicted. For ease of understanding, the braking unit 110 is described with reference to the components of FIGS. 1 and 2. The braking unit 110 includes the braking unit controller 114, the inducting unit 116, the power source 118, and the switching unit 120.

In the embodiment of FIG. 3, a capacitor 314 is coupled in parallel to the power source 118 to filter AC components in the current generated by the converter 210. Further, in an example embodiment, the converter 210 includes an inductor 316, a switch 318, and a diode 319. In one embodiment, the switch 318 comprises a MOSFET and/or an IGBT, for example. The switch 318 is coupled in parallel to the power source 118 and is controlled to increase a level of voltage provided from the power source 118 via the inductor 316. For example, the switching unit controller 216 may toggle the switch 318 to adjust a duty cycle of the voltage so as to increase the level of voltage provided by the power source 118. Further, the diode 319 is used to allow the energy associated with the increased level of voltage provided by the power source 118 towards the capacitor 212.

The capacitor 212 is coupled in parallel to the switch 318 through the diode 319. As discussed with respect to FIG. 2, the capacitor 212 is used to store a high voltage before receiving a brake command and to provide the stored high voltage to the inducting unit 116 when the brake command is received. Also, the capacitor 212 may be partially recharged with the energy in the inducting unit 116 when the brake command ceases. In one embodiment, the capacitor 212 comprises a capacitor bank for providing enough energy storage.

The bridge 214 is in turn coupled in parallel to the capacitor 212 in the embodiment of FIG. 3. In one example, the bridge 214 may comprise an H-bridge circuit having two branches coupled in parallel to the capacitor 212. Each branch comprises a pair of switches 320 and a pair of diodes 324 coupled to a respective inductor 322 in the inducting unit 116. Switches 320 may comprise MOSFETs in one embodiment. Each pair of switches 320 may be turned ON when the switching unit controller 216 receives the brake command in order to provide the voltage across the capacitor 212 to the inductors 322 in the inducting unit 116. In one example, the switches 320 are turned ON to move the switches 320 from a non-conducting state to a conducting state so that the electrical current flows from the capacitor to the inductors 322 via the switches 320.

Similarly, each pair of switches 320 may be turned OFF when the braking ends. Particularly, when the braking ends, the switches 320 may be turned OFF to move the switches 320 back to the non-conducting state so that the electrical current does not flow through the switches 320. However, energy that is accumulated in the inductors 322 may flow in an opposite direction through the diodes 324 to recharge the capacitor 212 to the fourth voltage level. Moreover, the energy provided by the inductors 322 may not be at the second voltage level due to electrical losses in the inductors 322. Thus, the capacitor 212 may only be charged to the fourth voltage level which is less than the second voltage level.

Figure 4:
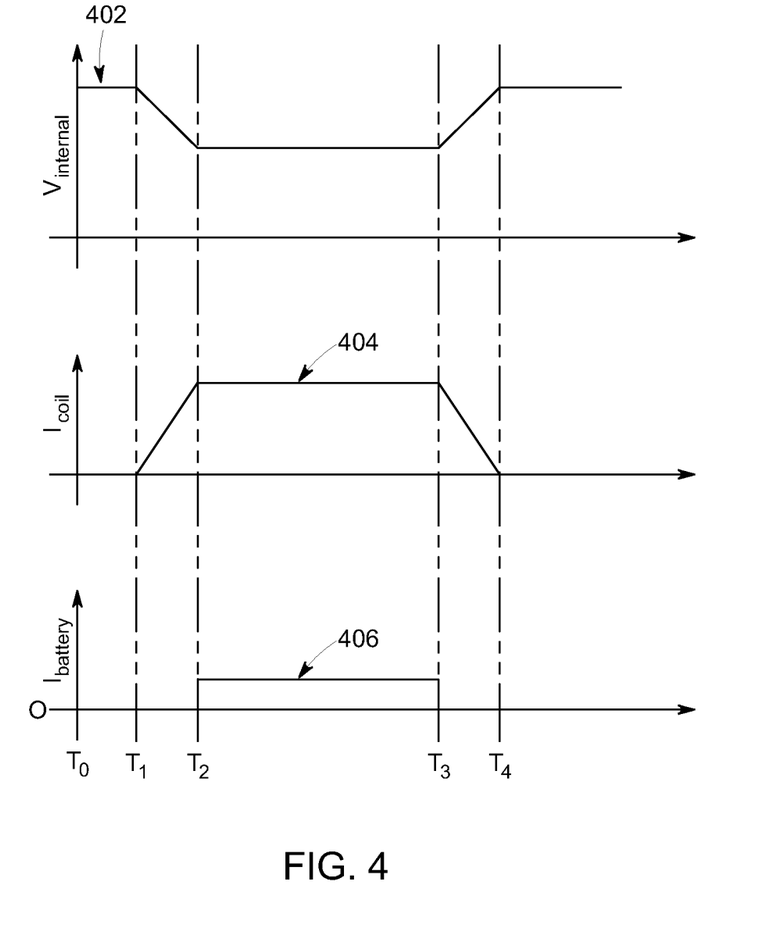
FIG. 4 illustrates signal waveforms of voltage and current signals in the braking unit, in accordance with aspects of the present disclosure.

FIG. 4 illustrates example signal waveforms of voltage and current signals in a braking unit, in accordance with aspects of the present disclosure. For ease of understanding, the signal waveforms are described with reference to the components of FIG. 3, and FIG. 4 is an example wherein the power source 118 comprises a battery. The signal waveforms include a capacitor voltage signal 402, a coil current signal 404, and a battery current signal 406. The capacitor voltage signal 402 represents voltage across the capacitor 212, the coil current signal 404 represents electrical current in the inductors 322, and the battery current signal 406 represents electrical current provided by the power source 118.

As depicted in FIG. 4, at time $T_0$, the capacitor voltage signal 402 is at maximum or peak level (meaning the capacitor 212 is fully charged to the second voltage level), and the coil current signal 404 and the battery current signal 406 are at zero levels. This is because no current is needed yet by the inducting unit, and, after the capacitor voltage reaches the second voltage level, the power source 118 need not continue supplying further electrical current until or unless the capacitor later becomes depleted.

Further, at time $T_1$, a brake command is received and the voltage across the capacitor 212 is provided to the inductors 322. Thus, the capacitor voltage signal 402 may start to ramp-down and the coil current signal 404 may start to ramp-up. When the capacitor 212 has very high voltage, such as, for example, about 400V, a change rate of the electrical current in the inductors 322 will also be very high. Therefore, the coil current signal 404 may ramp-up by time $T_2$. The time period between time $T_1$ and $T_2$ is referred to as a first time period. In one example, the first time period may be in a range from about 5 ms to about 50 ms.

Further, after time $T_2$, the coil current signal 404 may be operable at a steady state. However, electrical losses will be present in the inductors 322 such that some further current will be needed to maintain the coil current signal 404 at the steady state. In the embodiment of FIG. 4, after time $T_2$, the battery current signal 406 at a determined level may be continuously provided to the capacitor 212 so as to maintain the charge of the capacitor 212 at a third voltage level. In this embodiment, the electrical current from the capacitor 212 is continuously provided to the inductors 322 to compensate these electrical losses in the inductors 322.

Time $T_3$ represents time at which the brake command ceases. At this time, in the embodiment shown in FIG. 4, the energy in the inductors 322 is directed in the opposite direction to recharge the capacitor at the second voltage level. Thus, the capacitor voltage signal 402 may ramp-up, and the coil current signal 404 may ramp-down by time $T_4$. The time period between time $T_3$ and $T_4$ is referred to as a second time period. In one example, the second time period may be in a range from about 5 ms to about 50 ms. Also, at time T3, the power source 118 may cease to supply the battery current signal 406 as the capacitor 212 is recharged by the energy in the inductors 322. Thus, the battery current signal 406 from the power source 118 may drop to zero level at time $T_3$. This example presumes there is little inductor loss. In practice, the battery current signal may continue for some period of time to make up for any inductor losses and fully ramp back up capacitor voltage signal 402 as described with respect to FIG. 2.

Figure 5:
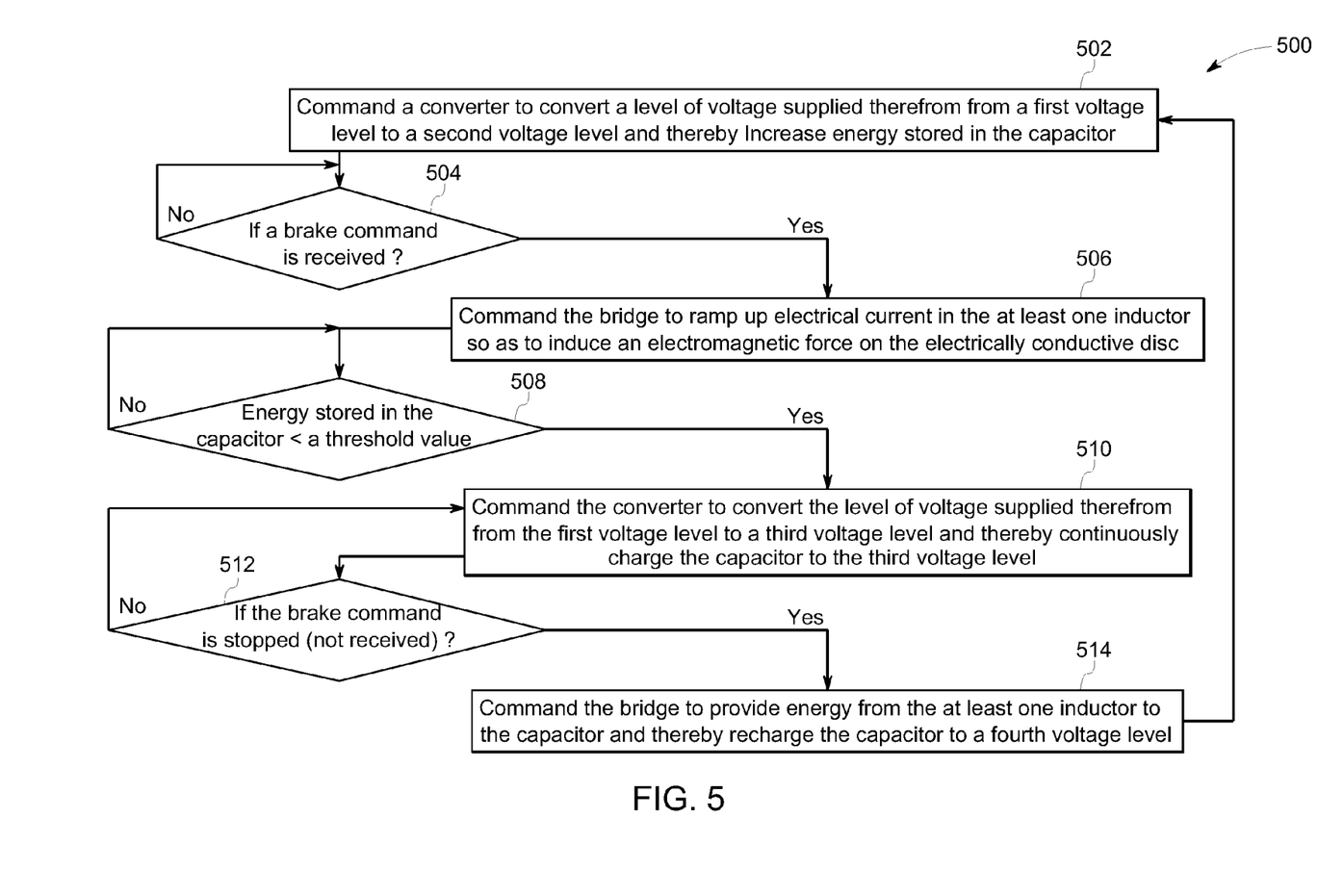
FIG. 5 is a flow chart illustrating a method for improving response time of the braking unit to induce an electromagnetic force, in accordance with aspects of the present disclosure.

Referring to FIG. 5, a flow chart illustrating a method for improving response time of a braking unit to induce an electromagnetic force, in accordance with aspects of the present disclosure, is depicted. For ease of understanding, the method 500 is described with reference to the components of FIGS. 2 and 3. The method 500 begins with step 502, where a level of voltage supplied by the power source 118 is converted from a first voltage level to a second voltage level so as to increase energy stored in the capacitor 212.

Subsequently, at step 504, the switching unit controller 216 verifies whether a brake command is received from a braking unit controller 114. If the switching unit controller 216 receives the brake command, then the method 500 moves to step 506. At step 506, the switching unit controller 216 commands the bridge 214 to ramp-up electrical current in the at least one inductor 322 so as to induce an electromagnetic force on the electrically conductive disc 106. Particularly, the bridge 214 may provide the energy stored the capacitor 212 to the at least one inductor 322. Since the capacitor 212 is charged to the second voltage level, the electrical current in the at least one inductor 322 may ramp up within a first time period. In one example, the first time period may be in a range from about 5 ms to about 50 ms. It may be noted that the term "ramp up" means ramping up the electrical current up to a significant fraction of its final value.

At step 508, energy stored in the capacitor is verified. Particularly, the switching unit controller 216 may periodically or continually determine whether the energy in the capacitor 212 is below a threshold value. If the energy in the capacitor 212 is below the threshold value, the method moves to step 510.

At step 510, the switching unit controller 216 commands the converter 210 to convert the level of voltage supplied therefrom from the first voltage level to a third voltage level so that the capacitor 212 is continuously charged to the third voltage level. This charging is useful because there may be electrical losses in the inductors 322 when the electrical current flows through the inductors 322.

When the brake command ceases, that status is detected at step 512, and the method moves to step 514 where the switching unit controller 216 commands the bridge 214 to provide energy from the at least one inductor 322 to the capacitor 212 and thereby recharge the capacitor 212 to a fourth voltage level. Thereafter, the method moves to back to the step 502 where the capacitor may be fully charged in preparation for the next brake command.

The various embodiments of the system and the method may be used for improving response time of the braking unit aid in riding LVRT within a desired time period. Additionally, when a battery is used as the power source and low cost power electronics are used for the converter and bridge in combination with the capacitor, the cost and size of the system remain reasonable.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A braking system, comprising:
a converter;
a capacitor coupled to an output of the converter;
a bridge coupled in parallel to the capacitor;
at least one inductor coupled to the bridge;
an electrically conductive disc disposed proximate to the at least one inductor; and
a switching unit controller for commanding the converter to convert a level of voltage supplied therefrom from a first voltage level to a second voltage level and thereby increase energy stored in the capacitor, and, upon receiving a brake command, commanding the bridge to ramp-up electrical current in the at least one inductor so as to induce an electromagnetic force on the electrically conductive disc.

2. The braking system of claim 1, wherein the electrical current is ramped up in the at least one inductor within 50 ms.

3. The braking system of claim 1, wherein the switching unit controller is programmed for, after commanding the bridge to ramp-up electrical current in the at least one inductor and upon determining that the energy stored in the capacitor is below a threshold value, commanding the converter to increase the level of voltage supplied therefrom from the first voltage level to a third voltage level.

4. The braking system of claim 3, wherein the third voltage level is less than the second voltage level.

5. The braking system of claim 3, wherein the switching unit controller is programmed for continuing to command the converter to increase the level of voltage supplied therefrom from the first voltage level to the third voltage level until the brake command ceases.

6. The braking system of claim 1, wherein the switching unit controller is further configured for commanding the bridge to provide energy from the at least one inductor to the capacitor and thereby recharge the capacitor to a fourth voltage level when the brake command ceases.

7. The braking system of claim 6, wherein the electrical current in the at least one inductor is ramped down within 50 ms after initiation of recharging of the capacitor.

8. The braking system of claim 7, wherein the switching unit controller is further configured for, after the capacitor is recharged to the fourth voltage level, commanding the converter to convert the level of voltage supplied therefrom from the first voltage level to the second voltage level.

9. The braking system of claim 1, wherein the first voltage level ranges from about 5V to about 50V.

10. The braking system of claim 9, wherein the second voltage level ranges from about 200V to about 600V.

11. A method for braking using a braking system comprising a converter, a bridge, a capacitor coupled in parallel between the converter and the bridge, at least one inductor, and an electrically conductive disc, the method comprising:

commanding the converter to increase a level of voltage supplied therefrom from a first voltage level to a second voltage level and thereby increase energy stored in the capacitor; and upon receiving a brake command, causing the bridge to ramp-up electrical current in the at least one inductor so as to induce an electromagnetic force on the electrically conductive disc.

12. The method of claim 11, further comprising, while the brake command remains active:

upon determining that the energy stored in the capacitor is below a threshold value, commanding the converter to convert the level of voltage supplied therefrom from the first voltage level to a third voltage level until the brake command ceases.

13. The method of claim 12, further comprising, upon the brake command ceasing:

commanding the bridge to provide energy from the at least one inductor to the capacitor and thereby recharge the capacitor to a fourth voltage level.

14. The method of claim 13, further comprising, after the capacitor is recharged to the fourth voltage level, commanding the converter to convert the level of voltage supplied therefrom from the first voltage level to the second voltage level and thereby increase the energy stored in the capacitor.

15. A power generation system comprising:

an electrically conductive disc coupled to a rotatable shaft;

at least one inductor disposed proximate to the electrically conductive disc;

a power source;

a switching unit coupled between the power source and the at least one inductor, wherein the switching unit comprises:

a converter;

a capacitor coupled to an output of the converter;

a bridge coupled in parallel to the capacitor; and a switching unit controller for commanding the converter to convert a level of voltage supplied therefrom from a first voltage level to a second voltage level and thereby increase energy stored in the capacitor, and, upon receiving a brake command, commanding the bridge to ramp-up electrical current in the at least one inductor so as to induce an electromagnetic force on the electrically conductive disc.

16. The power generation system of claim 15, wherein the at least one inductor induces the electromagnetic force on the electrically conductive disc to reduce a speed of the rotatable shaft below a threshold speed value.

17. The power generation system of claim 15, wherein the switching unit controller is further configured for, after commanding the bridge to ramp-up electrical current in the at least one inductor and upon determining that the energy stored in the capacitor is below a threshold value, commanding the converter to increase the level of voltage supplied therefrom from the first voltage level to a third voltage level.

18. The power generation system of claim 15, wherein the switching unit controller is further configured for commanding the bridge to provide energy from the at least one inductor to the capacitor and thereby recharge the capacitor to a fourth voltage level when the brake command ceases.

19. The power generation system of claim 18, wherein the switching unit controller is further configured for, after the capacitor is recharged to the fourth voltage level, commanding the converter to convert the level of voltage supplied therefrom from the first voltage level to the second voltage level.

* * * * *